United States Patent Office 3,492,248
Patented Jan. 27, 1970

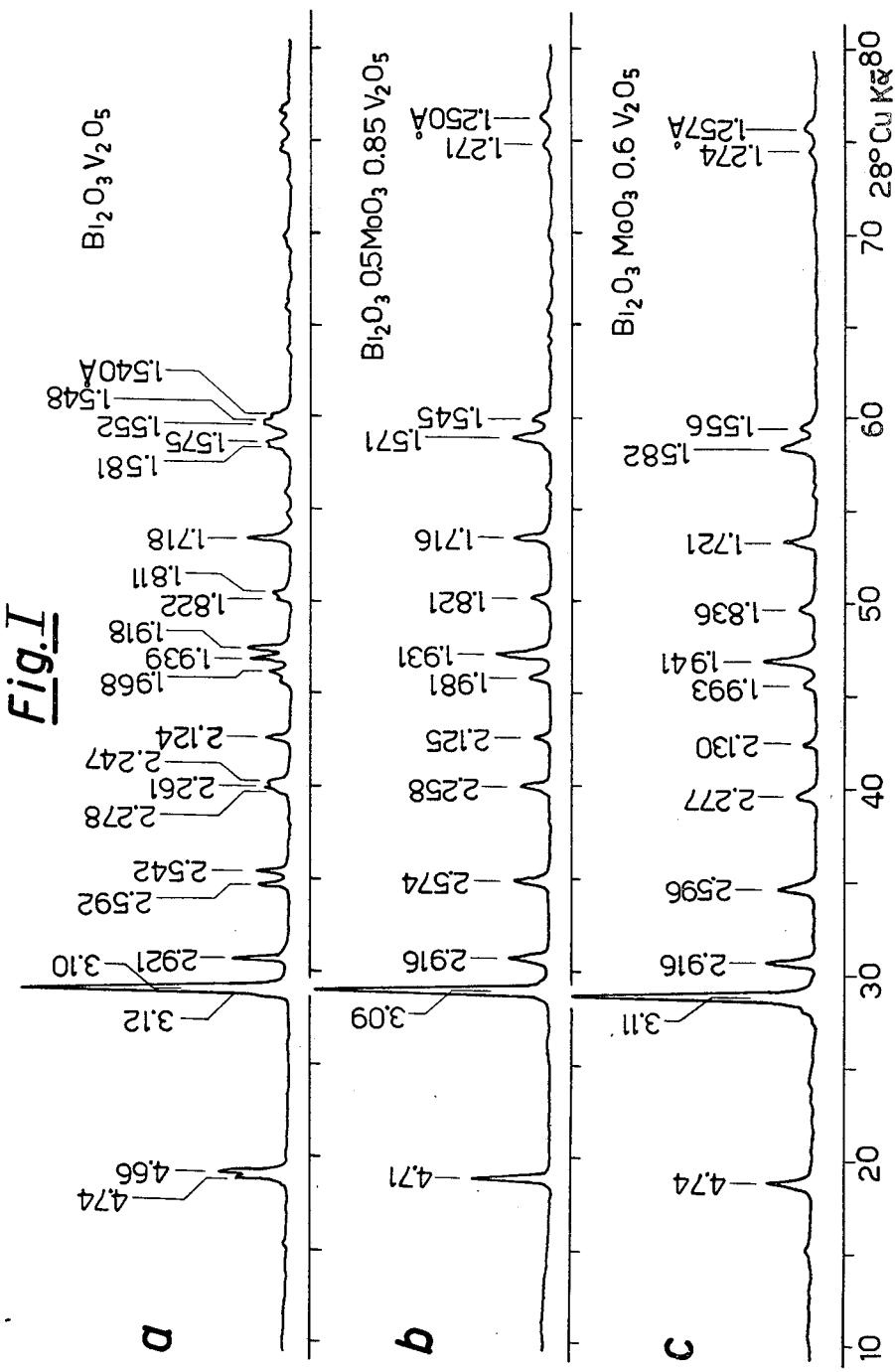
Fig. I

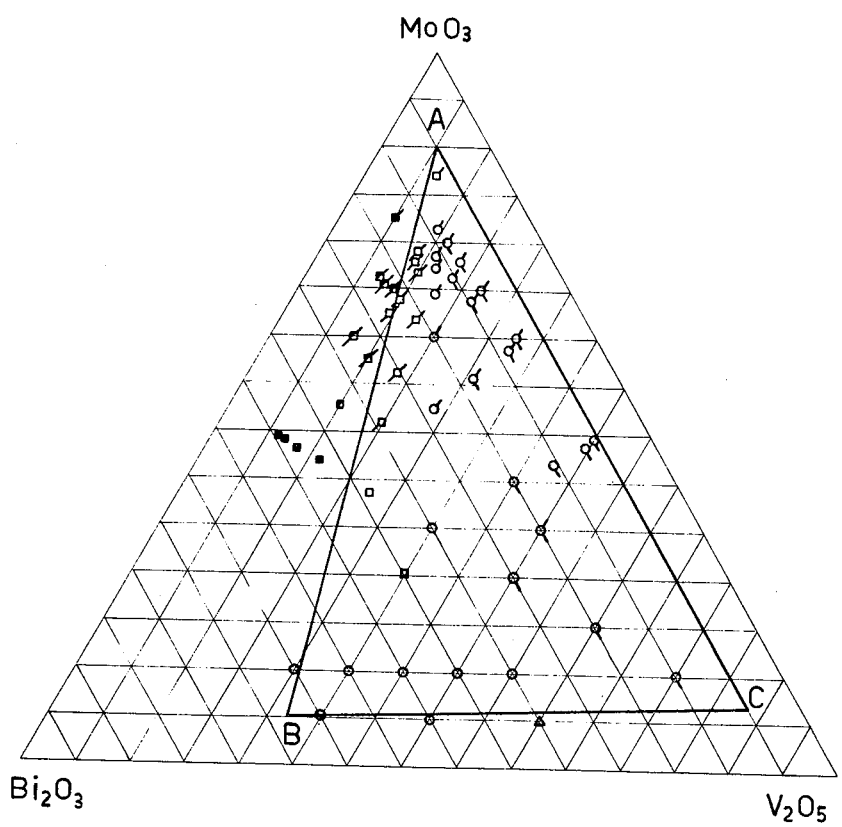

3,492,248
MOLYBDENUM - BISMUTH - VANADIUM TERNARY COMPOUNDS USEFUL AS OXIDATION CATALYSTS
Bruno Notari and Marco Cesari, San Donato Milanese, and Giovanni Manara and Giovanni Perego, Milan, Italy, assignors to Snam Progetti S.p.A., Milan, Italy, a company of Italy
Filed June 23, 1966, Ser. No. 559,882
Claims priority, application Italy, June 30, 1965, 14,797/65
Int. Cl. B01j 11/34, 11/06
U.S. Cl. 252—467    3 Claims

ABSTRACT OF THE DISCLOSURE

A catalyst for the reactions involved in the oxidation of hydrocarbons is provided which comprises molybdenum - bismuth - vanadium ternary compounds wherein the crystal lattice structure typifying monoclinic bismuth vanadates is distorted through the introduction of molybdenum atoms in place of vanadium atoms and the molar ratios of the components thereof are in the following range: $Bi_2O_3/MoO_3$ from 0.076 to 9.3; $Bi_2O_3/V_2O_5$ from 0.076 to 2.2; $V_2O_5/MoO_3$ from 0.076 to 9.3.

BACKGROUND OF THE INVENTION

It is an object of the present invention to provide new compounds useful as oxidation catalysts.

There are known many reactions useful from an industrial point of view which are based on the oxidation of organic compounds in the presence of suitable catalysts.

Among said reactions are those which lead to the preparations of phthalic anhydride or unsaturated aldehydes.

Many references specify a broad range of compounds able to perform the above mentioned reactions; to this group belong the metals comprised from the second to the seventh group of periodical table or their compounds, e.g., oxides or their mixture.

In U.S. Patent 2,081,272; 2,180,353; 2,294,130 and 1,636,854 there are mentioned oxides and their mixtures useful as oxidation catalysts.

In U.S. Patent 1,787,416 there is mentioned the possibility of employing vanadates, chromates, molybdates, uranates, stannates, arsenates and so on for the oxidation of organic compounds.

In U.S. Patent 2,491,695 there is particularly mentioned the bismuth molybdate as catalyst for the oxidation of methanol to formic aldehyde.

The British Patent 723,003 (Distillers) discloses the possibility of employing metal oxides and their mixture for the manufacture of unsaturated aldehydes.

On the other hand, it has been disclosed that it is possible to manufacture unsaturated nitriles by the reaction of olefins, ammonia and oxygen. This is of very high interest from the industrial point of view.

In U.S. Patent 2,481,826 (Cosby) there is described such a preparation also in the presence of catalysts which, when present, are selected from the ones capable of partially oxidizing organic compounds.

Another interesting reaction from the industrial point of view is the one which allows one to obtain diolefins from mono-unsaturated hydrocarbons, as by reacting butane in the presence of oxygen to produce butadiene; also in this case it is possible to resort to the abovementioned oxydation catalyst.

Now we have found new compounds useful as oxidation catalysts comprising vanadium, bismuth, molbdenum and oxygen in a predetermined mutual range.

Said compounds allow to carry out many reactions such as the above mentioned ones and they may be employed, every time an oxidation of organic compounds has to be performed.

Particularly, and from this point of view the invention will be illustrated, by reacting on this catalyst propylene, $NH_3$ and $O_2$ it is possible to obtain acrylonitrile together with minor amounts of by-products as acetonitrile an hydrocyanic acid.

The catalysts according to the present invention consist of molybdenum-bismuth-vanadium ternary compounds.

It has to be pointed out that said compounds have not the structure of a bismuth salt of a vanado-molybdic heteropolyacid.

The catalysts according to the present invention are characterized in that, statistically, they present a disorderly structure resulting from the introduction of molybdenum atoms in the place of vanadium atoms in the lattice typical of monoclinic $BiVO_4$.

Therefore said catalysts are not mixtures of oxides or heteropolyacid salts, since they may be considered bismuth vanadates presenting the crystal lattice distorted by introducing molybdenum atoms in the place of vanadium atoms.

The class of catalysts of the present invention is therefore different from the catalyst generally employed in the oxidation reactions. This class is characterized as above and does not comprise a single compound but a determinate number of compounds owing to the fact that the amount of molybdenum which may replace the vanadium in the lattice may vary on a determinate range.

Also if it is not possible to indicate said components in determinate formula since the introduction of some molbdenum atoms into the lattice gives a possibility of reticular vacancies, it is anyhow possible to characterize them by the relative proportions of the components and by the crystal structure which is of the tetragonal or pseudotetragonal type, clearly determinable by roentgenograhic analysis (X-rays analysis).

The X-rays analysis makes it possible to point out the structural differences in comparison with other known compounds and then to characterize the compounds of the present invention.

The catalysts of the present invention will be henceforth be designed as "vanado-molybdates" or "molybdo-vanadates", it being understood the said nomenclatures are not derived from structure of the kind of heteropolyacids but are assigned to disorderly structure as above defined.

From the structural point of view the vanado-molybdates according to the present invention show a roentgenographic spectrum which is simplified in comparison with the spectrum of $BiVO_4$; a simplified spectrum being intended to refer to one in which the splitting of several lines characteristic of $BiVO_4$ disappears, when the molar ratio $MoO_3$ to $V_2O_5$ is greater than 0.2. As said ratio is increased, the spectrum exhibits a progressive shifting of the lines towards values which correspond to higher interplanar distances, with short variations of intensity.

Taking into account the composition, the vanado-molybdates according to the invention are characterized in that their components are in a well defined range.

Another characteristic of the vanado-molybdates according to the invention is a high melting point, not lower than 700° C., and in practice above 800° C., and hence a high thermal stability.

The present invention will be better appreciated through reference to the drawings which show some compostions of the catalysts according to the present invention and the differences in comparison with other known catalysts.

The compounds according to the present invention may be classified in two fundamental groups:

(1) Composition 0.5 MoO$_3$.1Bi$_2$O$_3$.0.85V$_2$O$_5$.—The spectrum at room temperature of said compound is reported as (1b). It may be contrasted with the exemplary spectrum of BiVO$_4$ (FIG. 1a). Some double peak indeed (for instance at 4.74–4.66 A.; at 2.59–2.54 A. and at 1.93–1.91 A.) are reduced to single peaks (at 4.71±0.02 A., at 2.57±0.01 A. and at 1.93±0.01 A. respectively).

This peak disposition may be explained on the ground of an elemental tetragonal cell having a volume very near to the volume of the monoclinic cell of BiVO$_4$ but presenting a substantially different symmetry.

(2) Composition 1 MoO$_3$.1Bi$_2$O$_3$.0.6V$_2$O$_5$.—The interplanar values of the spectrum at room temperature, as shown in FIG. 1c, are all higher, (but substantially equal as for as their number and intensity are concerned), than the ones of the previous compound.

The structure of said compound is directly derived from the structure of the previous compound, but there is possible a loss of very tetragonal symmetry (pseudo-tetragonal elemental cell or distorted tetragonal cell). In this case the three above mentioned characteristic double peaks of the BiVO$_4$ spectrum are reduced to the single peaks at: 4.74±0.02 A., 2.60±0.01 A. and 1.94±0.01 A., respectively.

Any other ternary compounds may show a spectrum and hence have a symmetry of one of the abovementioned two types, with only slight parametric differences.

On the ternary phase diagram of FIG. 2 there are shown the existence zone of the ternary system Bi$_2$O$_3$.MoO$_3$.V$_2$O$_5$ depending on the molar percent amount of the three starting oxides. Said diagram defines the existence zone of a ternary system Mo-Bi-V in absence of binary compounds, in an amount detectable by the X-rays analysis.

In the marked zone of the figure, comprised into the ABC triangle, there are present the ternary compounds according to the invention. More particularly along the BC line there are ternary compounds characterized in that they still present the X-rays spectrum of BiVO$_4$, i.e. a monoclinic lattice notwithstanding the presence of molybdenum, with only parametric differences.

The relative proportions of components expressed as molar ratios among molybdenum, vanadium and bismuth oxides must vary in an interdependent manner according to the following ranges:

$$Bi_2O_3/MoO_3 = 0.076 \div 9.3$$
$$Bi_2O_3/V_2O_5 = 0.076 \div 2.2$$
$$V_2O_5/MoO_3 = 0.076 \div 9.3$$

Of course the compounds according to the present invention may present some impurities consisting for instance of free oxides or other unidentified impurities but of course it is clear that the catalyst activity depends on the purity of the compound.

The symbols and the respective meanings reported on FIG. 2 relative to molybdo-vanadate according to the invention are:

△: means the distorted monoclinic crystal lattice
○: means the tetragonal crystal lattice
□: means the distorted tetragonal crystal lattice Same symbols provided with one or more hyphens mean the presence in the compounds according to the invention of one or more impurities; the darkened small squares show the presence of bismuth molybdate in addition to the ternary compound.

The preparation of bismuth vanado-molybdate of the invention is preferably carried out according to one of two following methods.

(1) Ammonium para-molybdate is dissolved in an excess of water at 80° C., ammonium metavanadate is added thereto obtaining a deep yellow solution which is added to a nitric acid solution of bismuth nitrate. A more or less, according to the amount of vanadium, deep brick red precipitate is obtained in such a way.

After drying in the oven at 100° C. the precipitate is heated to 500° C.

(2) Ammonium para-molybdate is dissolved in ammonia-water solution, ammonium metavanadate is added thereto which in an ammonia solution does not show change in color.

Said suspension is added to the nitric acid solution of bismuth nitrate. Also in this case after drying in oven at 100° C. the suspension is heated to 500° C.

In the ternary compounds preparation it must be taken into account that the relative proportions of the reagents expressed as oxides molar ratios have to vary within the following ranges:

$$\frac{Bi_2O_3}{MoO_3}=0.076 \div 9.3; \frac{Bi_2O_3}{V_2O_5}=0.076 \div 2.2; \frac{V_2O_5}{MoO_3}=0.076 \div 9.3$$

The compounds according to the present invention show many advantages such as the versatility i.e. employment in different reactions together with a longer activity (resulting from their high thermal stability and high melting point). In any test they showed a better characteristic in comparison with oxide mixtures and a longer activity with the respect to many other salts having a melting point lower than 700° C., since the reactions catalyzed by those compounds take place in a temperature range of 450° to 550° C., therefore it is a great advantage to employ the catalysts according to the present invention, whose melting points are far higher than the reaction temperatures. In such a way it is possible to avoid the possibility of catalyst deactivation by melting or sintering; consequently it results in an increase of life and activity of the catalyst.

The following examples, are only given to illustrate the present invention without being restrictive of the invention itself. In said examples there is reported the preparation of some vanado-molybdates and their activity in the manufacture of acrylonitrile from olefins, ammonia and oxygen.

EXAMPLE 1

Ammonium para-molybdate (883 g.=5 moles of MoO$_3$) was dissolved at 80° C. in 1000 cc. of water, ammonium metavanadate (233.5 g.=1 mole of V$_2$O$_5$) was added thereto; a solution of bismuth nitrate (1663 g.=1.66 moles of Bi$_2$O$_3$) in 95 cc. of concentrated nitric acid and 915 cc. of water was then added while stirring.

After adding 718 g. of silica the mixture is kept under stirring for some hours then dried in oven at 100° C., ground and heated at 500° C.

The structure of the resulting compound is shown by the spectrum characteristic of Bi$_2$O$_3$.MoO$_3$.0.6V$_2$O$_5$ (FIG. 1c); said spectrum showing in addition the presence of free molybdic anhydride. The composition of the compound is: 3 MoO$_3$.1 Bi$_2$O$_3$.0.6V$_2$O$_5$ on silica (50%).

EXAMPLE 2

Ammonium paramolybdate (883 g.=5 moles of MoO$_3$) was dissolved at 80° C. in 10000 cc. of water, ammonium metavanadate (233.5=1 mole of V$_2$O$_3$) was added thereto; then was added, under stirring, a solution of bismuth nitrate (1663 g.=1.66 moles of Bi$_2$O$_3$) in 95 cc. of concentrated nitric acid and 915 cc. of water.

After being added 718 g. of celite, the mixture was kept under stirring for some hours, then dried, ground and heated at 500° C. The structure and the composition of the obtained product was analogous to the one of the Example 1 (but naturally carried on celite).

EXAMPLE 3

A catalyst was prepared according to the Example 1 by dissolving at 80° C., 220.75 g. of ammonium para-molybdate (1.25 moles of MoO$_3$) in 2000 cc. of H$_2$O, by adding to this solution 175.5 g. of ammonium metavanadate (0.75 mole of V$_2$O$_5$) and adding, under stirring, this solution to another solution of 1212.75 g. of bismuth nitrate (1.25 moles) in 70 cc. of concentrate H NO$_3$ and 670 cc. of water. 2965 g. of Ludox A.S. silica (899 g. of SiO₂) were added thereto, and then dried at 100° C. ground and heated to 500° C. The structure is a distored tetragonal one (FIG. 1c) and the composition of the catalyst is: 1MoO₃·1Bi₂·0.6V₂O₅ on silica (50%).

EXAMPLE 4

A catalyst was prepared according to the Example 1 by dissolving at 80° C., 530 g. of ammonium paramolybdate (3.0 moles of MoO₃) in 4000 cc. of water, by adding 351 g. of ammonium metavanadate (1.5 moles of V₂O₅) and adding thereto, under vigorous stirring, 2425 g. of bismuth nitrate (2.5 moles) dissolved in 140 cc. of conc. nitric acid and 1340 cc. of water. Then 801.5 g. of celite are added therein; the mixture was stirred for some hours freed in an oven, ground and heated to 500° C. The product shows a very defined structure without any secondary phases and may be explained as a slight distorted tetragonal one (whose spectrum lies between the spectra repored on FIGURES 1b and 1c). The composition of the product is 1.2MoO₃·1Bi₂O₃·0.6V₂O₅ on celite (70%).

EXAMPLE 5

Ammonium paramolybdate 528 g. (3 moles MoO₃) was dissolved in 390 cc. of ammonia and 1200 cc. of water. The mixture was heated at 80° C. and then ammonium metavanadate 140.1 g. (0.60 mole of V₂O₅) was added thereto and the hot mixture was stirred. The suspension obtained in such a way was added to a bismuth nitrate solution (996 g.=1 mole of Bi₂O₃ in 78 cc. of nitric acid and 540 cc. of water). This mixture was stirred for one hour, then 3316.5 g. of Ludox A.S. silica (1005 g. of CiO₂) were added thereto and were stirred for 18 hours. The mixture was dried in an oven at 100° C., ground and heated at 500° C. The product composition was the same as in Example 1.

EXAMPLE 6

A catalyst was prepared as in Example 5 but 1005 g. of celite were added instead of Ludox silica.

After stirring for 5 hours, the product was dried in an oven at 100° C., then ground and heated at 500° C. The composition was analogous to that in Example 5 but the carrier was celite (50%).

EXAMPLE 7

A catalyst was prepared as in Example 5, employing 528 g. of ammonium para-molybdate (3 moles of MoO₃) in 390 cc. of ammonia and 120 cc. of water, 351 g. of NH₄VO₃ (1.5 miles of V₂O₅) and 2425.5 g. of bismuth nitrate (2.5 moles of Bi₂O₃) in 243 cc. of nitric acid and 1900 cc. of water and 6171 g. of Ludox A.S. silica (containing 30% of silica).

The resulting structure was of the distorted type (FIG. 1c) without the presence of secondary phases detectable by X-ray analysis. The composition was analogous to the one of Example 4, supported on silica 50%.

EXAMPLE 8

A catalyst prepared as in Example 7, but adding 801.5 g. of celite instead of A.S. Ludox silica. The product composition was the same as in Example 4.

EXAMPLE 9

The activity and the characteristics of the catalysts according to the invention, are shown by the following example.

A catalyst was prepared by mixing a water solution of ammonium molybdate and ammonium vanadate with a nitric acid solution of bismuth nitrate and with celite in order to obtain, after treatments as in previous examples, a catalyst supported on 50% of carrier. Said catalyst presented 10/6/6 atomic ratios Bi/V/Mo i.e. 55.9% Bi, 8.2% V and 15.4% Mo. The X-rays spectrum of said catalyst was the characteristic one of bismuth vanadate but presenting a distorted tetragonal structure without free MoO₃. Said catalyst was extruded in small cylinder (4 x 6 mm.) and was placed in a reaction jacket tube having 40 mm. of internal diameter, heated with a hot liquid circulation; the height of the catalytic bed was 4 meters.

Through the tube was fed at different rates of flow a gaseous mixture of the following volumetric composition: C₃H₆ 5.8%, NH₃ 6.4%, air 58.6%, water 29.2%.

The catalytic bed temperature during the reaction was 480 to 520° C.; the reaction was carried out at almost atmospheric pressure. The results of tests carried at different feed rates are summarized on the following table. Molar yield means moles of acrylonitrile (ACN), acetonitrile (ACEN), hydrocyanic acid (HCN) and acroleine (Acrol.) obtained from 100 moles of fed propylene. Selectivity means moles of obtained acrylonitrile from 100 moles of reacted propylene.

| Linear gas rate into the empty tube m./sec. | Conversion C₃H₆ percent | Molar yield, percent | | | | Selectivity, ACN |
|---|---|---|---|---|---|---|
| | | ACN | ACEN | HCN | Acrol. | |
| 0.5 | 94.2 | 64.0 | 3.2 | 10.4 | 0.5 | 68.0 |
| 1 | 94.3 | 65.1 | 3.0 | 11.2 | Traces | 69.0 |
| 1.5 | 92.0 | 64.8 | 3.5 | 13.0 | 0.6 | 70.5 |
| 2.0 | 92.6 | 64.4 | 3.3 | 14.7 | Traces | 69.5 |
| 3.0 | 96.8 | 67.2 | 4.2 | 16.2 | 0.6 | 69.4 |
| 5.0 | 93.9 | 64.1 | 4.9 | 14.6 | 1.0 | 68.3 |

EXAMPLE 10

The catalyst of the Example 1 was employed in a pilot plant apparatus consisting of a reaction tube filled with said catalyst; the tube may be fed with reagents at a high space velocity. The reaction conditions were as follows: temperature 480-520° C.;

C₃H₆/NH₃/air/H₂O=1/1.4/9.0/45

C₃H₆ concentration 1.8% by volume.

On the following table are reported the results of a series of tests carried out increasing the sapce velocity.

| Space velocity C₃H₆ Nl/1h | Conversion C₃H₆, percent | Molar yield | | | | Ratio | | | Prod. G. ACN/ h1 | Balance C, percent | Select. ACN, percent |
|---|---|---|---|---|---|---|---|---|---|---|---|
| | | ACN | ACEN | HCN | Acrol. | CO₂ | CO | ACN/RCN[1] | | | |
| 11.1 | 88.5 | 57.2 | Not det. | 17 | Traces | 28 | 6 | | 15.0 | 85 | 64.7 |
| 21.9 | 74.0 | 45.9 | 4.0 | 11.7 | do | 23 | 8 | 74.5 | 23.8 | 98 | 62.0 |
| 22.9 | 73.2 | 49.7 | 2.7 | 14.3 | 1.5 | 18 | 24 | 74.5 | 26.3 | 89 | 67.9 |
| 29.5 | 66.6 | 42.4 | 2.1 | 12.3 | Traces | 19 | 17 | 74.5 | 29.6 | 83 | 63.7 |

[1] RCN=ACN+ACEN+HCN.

EXAMPLE 11

The catalyst of Example 3 was employed in the same apparatus as in Example 10.

Temperature 480–520° C.,

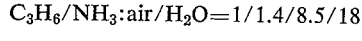

C₃H₆:NH₃:air/H₂O=1/1.4/8.5/18

C₃H₆ concentration 3.5%.

In the following table are reported the results of a series of tests carried out at increasing space velocity.

| Space velocity C₃H₆ Nl/1h | Conversion C₃H₆, percent | Molar yield | | | | | | Select. Ratio | | Prod. G. ACN/ hl | Balance C, percent |
|---|---|---|---|---|---|---|---|---|---|---|---|
| | | ACN | ACEN | HCN | Acrol. | CO₂ | CO | ACN, percent | ACN/RCN, percent | | |
| 20.5 | 78.4 | 46.1 | 0.3 | 12.2 | Traces | 29 | 4 | 58.8 | 78.8 | 22.4 | 83 |
| 23.3 | 74.5 | 46.8 | 1.3 | 11.7 | Traces | 17 | 4 | 62.8 | 78.3 | 25.8 | 85 |
| 24.0 | 78.9 | 47.1 | 0.9 | 11.1 | 3.0 | 18 | 12 | 59.7 | 79.7 | 26.7 | 85 |
| 26.7 | 71.8 | 44.4 | 1.4 | 11.7 | Traces | 21 | 5 | 61.8 | 77.2 | 28.0 | 86 |
| 27.8 | 75.8 | 44.5 | 1.6 | 11.1 | 2.5 | 23 | 10 | 58.7 | 77.8 | 29.3 | 89 |
| 36.4 | 73.7 | 45.1 | 1.4 | 10.2 | 2.6 | 20 | 10 | 61.2 | 79.6 | 38.9 | 85 |
| 48.2 | 71.3 | 44.3 | 0.5 | 9.2 | 1.2 | 15 | 6 | 62.2 | 82.0 | 50.5 | 98 |

EXAMPLE 12

The same apparatus of the previous example was employed with the catalyst of Example 4.

Temperature 480–520° C., $C_3H_6/NH_3/air/H_2O = 1/1.3/8.5/25$ $C_3H_6$ concentration 2.8% by volume.

In the following table are reported the results of a series of tests carried out at increased space velocity.

| Space velocity C₃H₆ Nl/1h | Conversion C₃H₆, percent | Molar yield | | | | | | Select Ratio | | Prod. G. ACN/ hl | Balance C, percent |
|---|---|---|---|---|---|---|---|---|---|---|---|
| | | ACN | ACEN | HCN | Acrol. | CO₂ | CO | ACN, percent | ACN/RCN, percent | | |
| 12.7 | 100 | 70.8 | 3.0 | 14.3 | Traces | 32 | 4 | 70.8 | 80.4 | 21.3 | 90 |
| 16.8 | 97.2 | 71.2 | 1.3 | 13.1 | do | 28 | 2 | 73.3 | 83.2 | 28.3 | 89 |
| 19.7 | 93.4 | 60.4 | 2.2 | 9.7 | 1.5 | 25 | 8 | 64.6 | 83.6 | 28.2 | 85 |
| 21.4 | 100 | 67.7 | 1.9 | 12.1 | Traces | 24 | 8 | 67.7 | 82.9 | 34.3 | 84 |
| 23.9 | 94.3 | 64.2 | 1.3 | 11.1 | do | 19 | 4 | 68.1 | 83.8 | 36.3 | 82 |
| 25.1 | 94.9 | 65.7 | 1.5 | 12.2 | 1.6 | 25 | 3 | 69.2 | 82.8 | 38.9 | 87 |
| 28.5 | 92.0 | 60.2 | 1.4 | 11.0 | Traces | 23 | | 65.4 | 81.8 | 40.7 | 81 |
| 30.1 | 94.7 | 64.2 | 0.7 | 11.3 | do | 20 | 3 | 67.8 | 84.2 | 75.7 | 82 |

EXAMPLE 13

384.6 g. of ammonium heptamolybdate (corresponding to 313.3 g. of MoO₃=2.175 mol) are dissolved in 870 mls. water at 40° C. and there are added thereto 284 mls. of 32% ammonium hydroxide solution and then 207 g. of ammonium metavanadate (corresponding to 161.6 g. of V₂O₅=0.89 mol).

The vanadium-molybdic suspension thus obtained is poured in a solution of 1553 g. bismuth nitrate in 107 mls. HNO₃ (65% by weight) and 1120 mls. water. Vigorous stirring is maintained for 30 mins. and there are added, still with stirring, 4068 g. colloidal silica (30%) stabilized with ammonia, the mixture is dried by atomisation and the thus obtained slurry is granulated.

The small cylinders thus obtained are fired at up to 500° C. The composition of the catalyst is 1.36MoO₃.1Bi₂O₃.0.55V₂O₅ on 50% silica.

The thus prepared catalyst is tested in the apparatus described in Example 10.

The reaction conditions are as follows:

Temperature 564–535° C.; C₃H₆/NH₃/air/H₂O ratios: 1/1.30/9.5/15.

The table reports the average value obtained in 10 tests.

Space velocity, C₃H₆ (Nl/1h) _____ 24.3
Conversion, C₃H₆ (percent) _____ 91.4
Molar ratio:
    ACN _____ 61.0
    ACEN _____ 3.9
    HCN _____ 11.5
    Acrol. _____ 2.6
    CO₂ _____ 34.2
Select. Ratio:
    CO _____ 7.9
    ACN (percent) _____ 66.8±1.5
    ACN/RCN (percent) _____ 79.8
Prod. balance:
    G./ACN/hl _____ 35
    C (percent) _____ 96

RCN=ACN+ACEN+HCN

EXAMPLE 14

529 g. of ammonium heptamolybdate are dissolved in 388 mls. of 32% NH₄OH and in 1200 mls. of water and 234 g. ammonium metavanadate are added thereto.

The vanadian molybdic suspension thus obtained is poured in a solution of 1940 g. bismuth nitrate in 145 mls. of 65% HNO₃ and 1500 mls. water maintained under vigorous stirring. 5147 g. of 30% colloidal silica stabilized with ammonia are added thereto.

The mixture is dried by atomisation and granulated. The small cylinders thus obtained are fired up to 500° C.

Composition: 1.50MoO₃.1Bi₂O₃.0.50V₂O₅ on 50% silica.

The thusly prepared catalyst is tested in the apparatus described in Example 10.

The reaction conditions are as follows:

Temperature 465–535° C.; C₃H₆/NH₃/air/H₂O ratios: 1/1.26/10.24/19.28.

The table reports the average values obtained after 10 tests.

Space velocity, C₃H₆ (Nl/1h) _____ 24.3
Conversion, C₃H₆ (percent) _____ 82.6
Molar yield:
    ACN _____ 56.1
    ACEN _____ 3.5
    HCN _____ 10.1
    Acrol. _____ 3.8
    CO₂ _____ 19.2
Select. ratio:
    CO _____ 6.1
    ACN (percent) _____ 68.0±1.3
    ACN/RCN (percent) _____ 80.5
Prod. balance:
    G./ACN/hl _____ 32.2
    C (percent) _____ 91.4

RCN=ACN+ACEN+HCN

EXAMPLE 15

353.5 g. of ammonium heptamolybdate are dissolved in 810 mls. water and 260 mls. of 32% NH₄OH. 272.5 g. ammonium metavanadate are added thereto.

The thusly obtained vanadium-molybdic suspension is added, with energetic stirring, to a solution of 1.778 g. bismuth nitrate in 115 mls. HNO₃ and 1200 mls. H₂O.

Still with stirring, are added 4.510 g. of 30% colloidal silica, stabilized with ammonia, the mixture is dried by atomisation and granulated.

The small cylinders thus obtained are fired up to 500° C.

The composition of the active paste is:

$$1.09MoO_3.1Bi_2O_3.0.64V_2O_5$$

supported by 50% silica.

The thusly prepared catalyst is tested in the apparatus described in Example 10.

The reaction conditions are as follows:

Temperature 475–530° C.; $C_3H_6/NH_3/air/H_2O$ ratios: 1/1.18/10.28/13.5.

The table reports the average values obtained in 11 tests.

| | |
|---|---|
| Space velocity, $C_3H_6$ (Nl/1h) | 24.2 |
| Conversion, $C_3H_6$ (percent) | 89.6 |
| Molar ratio: | |
| ACN | 29.2 |
| ACEN | 3.2 |
| HCN | 12.5 |
| Acrol. | 3.5 |
| $CO_2$ | 35.5 |
| Select. ratio: | |
| CO | 13.7 |
| ACN (percent) | 66.1±1.3 |
| ACN/RCN (percent) | 79.0 |
| Prod. balance: | |
| G./ACN/h1 | 33.9 |
| C (percent) | 97 |

RCN=ACN+ACEN+HCN

EXAMPLE 16

289 g. ammonium heptamolybdate are dissolved in 3.670 mls. water and 213.6 mls. ammonium hydroxide. With energetic stirring, 155.5 g. of $NH_4VO_3$ are added in suspension thereto. To the thusly obtained suspension is added during 15 mins. the solution of 1.167 g. of bismuth nitrate in 840.7 mls. water and 80.5 mls. $HNO_3$. 1.800 g. of 50% silica sol are added and stirring is continued for 30 mins. whereafter drying by atomisation is effected.

The product is granulated and fired up to 500° C.

The molar composition of the catalyst is: 1.36 $MoO_3$. 1 $Bi_2O_3$·0.55 $V_2O_5$ on 50% silica.

The thusly prepared catalyst is tested in the apparatus described in Example 10.

The reaction conditions are as follows:

Temperature: 470-520° C.; $C_3H_6/NH_3/air/H_2O$ ratios: 1/1.31/10.8/31.2.

The table reports the average values obtained from 10 tests.

| | |
|---|---|
| Space velocity, $C_3H_6$(Nl/1h) | 24.6 |
| Conversion, $C_3H_6$ (percent) | 94.6 |
| Molar yield: | |
| ACN | 65.0 |
| ACEN | 3.2 |
| HCN | 13.1 |
| Acrol. | 2.6 |
| $CO_2$ | 28.6 |
| Select. ratio: | |
| CO | 16.5 |
| ACN (percent) | 68.7±1.6 |
| ACN/RCN (percent) | 79.9 |
| Prod. balance: | |
| G. ACN/h1 | 38.2 |
| C (percent) | 94.7 |

RCN=ACN+ACEN+HCN

EXAMPLE 17

530 g. ammonium heptamolybdate (corresponding to 432 g. $MoO_3$=3 mol) are dissolved in 1.200 mls. water and 390 mls. ammonia.

351 g. ammonia metavanadate are added thereto (corresponding to 273 g. of $V_2O_5$=1.5 mol).

The vanadium-molybdic suspension thus obtained is added with energetic stirring to a solution of 2.425 g. of bismuth nitrate (corresponding to 1.65 g. of $Bi_2O_3$=2.5 mol) in 243 mls. $HNO_3$ and 1.900 mls. water.

Still with stirring 6.170 g. of 30% colloidal silica are added thereto, the product is dried in oven, the paste is ground and granulated.

The obtained small cylinders are fired up to 500° C. The composition of the active paste is $$1.2MoO_3 \cdot 1Bi_2O_3 \cdot 0.6V_2O_5$$

on 50% silica.

The thusly prepared catalyst has been employed in the dehydrogenation of butene-1 with ratios $$C_4H_8:air/water=1/6.5/24.$$

The results obtained thereby are tabulated below:

| Space velocity $C_4H_8$ Nl/h1 | Temp., °C. | Conv. $C_4H_8$, percent | Molar yields percent | | | | Selectivity in butadione, percent | Balance C, percent |
|---|---|---|---|---|---|---|---|---|
| | | | Butadiene | Acrolein | $CO_2$ | CO | | |
| 18.5 | 500-525 | 96.6 | 41.8 | 10.0 | 78 | 16 | 43.3 | 80 |
| 17.7 | 480-513 | 90.6 | 62.4 | 4.0 | 51 | 5 | 69.0 | 92 |

EXAMPLE 18

The same catalyst as in the preceding example has been tested in the reaction of ammonoxidation of butene-1, acrylonitrile, acetonitrile, hydrogen cyanide and butadiene being obtained besides small amounts of $C_4$-nitriles.

The results thus obtained are tabulated below:

| 1 | 2 | | | | 3 | 4 | 5 | | | | | | | 6 | 7 |
|---|---|---|---|---|---|---|---|---|---|---|---|---|---|---|---|
| Space velocity $C_4H_8$ Nl/h1 | Intake molar ratios | | | | Temp., °C. | Conv. $C_4H_8$, percent | Molar yields, percent | | | | | | | Selectivity in butadiene, percent | Balance C, percent |
| | $NH_3/C_4H_8$ | $Air/C_4H_8$ | $H_2O/C_4H_8$ | | | | Buta- | ACN | ACEN | HCN | $C_4$ nitriles | Acrolein | $CO_2$ | CO | | |
| (a) 18.1 | 1.45 | 10.5 | 22 | | 488-515 | 99 | 35.8 | 12.1 | 5.6 | 18.9 | (¹) | (²) | 58 | 17 | 36.2 | 80 |
| (b) 18.3 | 1.40 | 10.5 | 24 | | 500-515 | 96.6 | 45.0 | 11.9 | 4.0 | 20.8 | (¹) | (²) | 66 | 15 | 46.6 | 85 |
| (c) 18.6 | 1.36 | 11.3 | 28 | | 503-515 | 97.8 | 40.7 | 11.1 | 5.7 | 17.0 | 1.0 | (²) | 68 | 21 | 41.6 | 84 |

¹ Not determined.
² Traces.

The embodiments of the invention in which an exclusive property or privilege is claimed are defined as follows:

1. A catalyst for the oxidation of hydrocarbons comprising a compound containing vanadium, molybdenum, bismuth and oxygen, at molar ratios in the following range: $Bi_2O_3/MoO_3$ from 0.076 to 9.3; $Bi_2O_3/V_2O_5$ from 0.076 to 2.2; $V_2O_5/MoO_3$ from 0.076 to 9.3, characterized in that it presents a crystal lattice derived from the lattice of $BiVO_4$ modified by the presence of molybdenum atoms.

2. A compound according to claim 1, characterized in that said crystal lattice shows on the roentgenographic spectrum at least three single peaks in correspondence respectively of the interplanar distances of 4.71±0.02 A.; 2.57±0.01 A. and 1.93±0.01.

3. A compound according to claim 1, characterized in that said crystal lattice shows on the roentgenographic spectrum single peaks corresponding to higher interplanar distances and at least three single peaks at the interplanar distances 4.74±0.02 A.; 2.60±0.01 A. and 1.94±0.01 A., respectively.

References Cited

UNITED STATES PATENTS 3,321,507   5/1967   Ginnasi et al. _____ 252—467

DANIEL E. WYMAN, Primary Examiner

P. E. KONOPKA, Assistant Examiner

U.S. Cl. X.R.

23—315; 252—459; 260—465.3, 680

PO-1050
(5/69)

UNITED STATES PATENT OFFICE
CERTIFICATE OF CORRECTION

Patent No. 3,492,248    Dated January 27, 1970

Inventor(s) Bruno Notari, et al

It is certified that error appears in the above-identified patent and that said Letters Patent are hereby corrected as shown below:

Column 1, line 65, change "butane" to --butene--.

Column 2, line 31, change "components" to --compounds--.

line 44, after "henceforth" delete --be--.

Column 3, line 3, change "(1b)" to read -- 1b --.

line 4, change "peak" to --peaks--.

Column 4, line 56, change "10000" to read --1000--.

line 57, change "$V_2O_3$" to read -- $V_2O_5$ --.

Column 5, line 32, change "$CiO_2$" to read -- $SiO_2$ --.

line 68, change "miles" to read --moles--.

Column 6, line 57, correct spelling of --space--.

Columns 5-6, in the second table, under the heading "Prod. G.ACN/hl" change "26.3" to read --26.2--.

UNITED STATES PATENT OFFICE
CERTIFICATE OF CORRECTION

PO-1050 (5/69)

Patent No. 3,492,248    Dated January 27, 1970

Inventor(s) Bruno Notari, et al

It is certified that error appears in the above-identified patent and that said Letters Patent are hereby corrected as shown below:

Column 6, between lines 69-70, insert --The operating conditions are:--.

Columns 7-8, in the first table, under heading "Select Ratio ACN/RCN, percent" change "78.8" to --78.7--.

under heading "Balance C, percent", line 6, change "85" to read --88--, and line 7 change "98" to read --95--.

Column 7, between lines 14 and 15, insert --The operating conditions are:--.

In the second table, after heading "conversion $C_2H_6$" delete --per--.

line 55, after "Temperature" change "564" to read --465--.

Column 10, line 21, change "1.65" to read --1.165--.

Signed and sealed this 19th day of March 1974.

(SEAL)
Attest:

EDWARD M. FLETCHER, JR.
Attesting Officer

C. MARSHALL DANN
Commissioner of Patents